United States Patent [19]

Koizumi

[11] 4,210,947
[45] Jul. 1, 1980

[54] PROTECTIVE CIRCUIT FOR A SWITCHING REGULATOR

[75] Inventor: Akio Koizumi, Tokyo, Japan

[73] Assignee: Sony Corporation, Tokyo, Japan

[21] Appl. No.: 948,578

[22] Filed: Oct. 4, 1978

[30] Foreign Application Priority Data

Oct. 6, 1977 [JP] Japan .................................. 52-120343
Oct. 31, 1977 [JP] Japan .................................. 52-130669

[51] Int. Cl.$^2$ .......................................... H02H 7/10
[52] U.S. Cl. ........................................ 361/18; 361/98; 361/103; 363/21
[58] Field of Search ....................... 361/18, 93, 98, 103, 361/140, 161; 363/21, 26, 55, 56

[56] References Cited

U.S. PATENT DOCUMENTS

| | | | |
|---|---|---|---|
| 3,930,186 | 12/1975 | Sekiya et al. | 361/103 X |
| 4,024,437 | 5/1977 | Suzuki | 361/18 X |
| 4,087,850 | 5/1978 | Koizumi | 363/21 |

Primary Examiner—Harry E. Moose, Jr.
Attorney, Agent, or Firm—Hill, Van Santen, Steadman, Chiara & Simpson

[57] ABSTRACT

A protective circuit for a switching regulator includes a DC voltage source having a pair of terminals, a transformer having primary, secondary windings and a magnetic core, a switching transistor having first, second and third electrodes, a circuit for connecting the second and third electrodes between the pair of terminals through the primary winding, a DC output circuit connected across the secondary winding to produce a DC signal in response to the ON/OFF operation of the switching transistor, a control circuit connected to the first electrode of the switching transistor so as to ON/OFF-control the switching transistor in response to the DC signal, a detecting circuit for detecting an over-current flowing through the primary winding of the transformer and for producing a control signal in accordance with a change of the saturated magnetic flux density of the magnetic core when the temperature thereof is increased to a predetermined value, and a protective circuit for stopping the ON/OFF operation of the switching transistor in response to the control signal from the detecting circuit.

9 Claims, 13 Drawing Figures

PROTECTIVE CIRCUIT FOR A SWITCHING REGULATOR

BACKGROUND OF THE INVENTION

1. Field of the Invention

The present invention relates generally to a protective circuit for a switching regulator, and is directed more particularly to a protective circuit for a switching regulator by which a transformer and so on used therein are effectively prevented from being damaged by the temperature increase in the transformer.

2. Description of the Prior Art

In the art there has been proposed a protective circuit for a switching regulator in which a special thermal fuse is provided so as to protect a transformer used therein from being damaged by the temperature increase thereof as shown in FIG. 1. In the figure, 1 designates a DC power source provided by rectifying a commercial power source, for example, a battery whose positive electrode is connected through a special thermal fuse 2, which is molten and hence cut off at a predetermined temperature, to one end of a primary winding 3a of a transformer 3. In this case, the thermal fuse 2 is located near the transformer 3, i.e., its core. The other end of the primary winding 3a is connected to the collector of an NPN-type transistor 4 which serves as a switching element. The switching transistor 4 is connected at its emitter to the negative electrode of the battery 1 and at its base to the output side of a pulse width modulator 5. A secondary winding 3b of the transformer 3 is connected through a regulator circuit 6 to a load 7. The output side of the regulator circuit 6 is connected to one of the input terminals of an error voltage detector circuit 8 which is supplied at its other input terminal with a reference voltage from a reference voltage source 9. An error signal appears at the output side of the error voltage detector 8 is applied through an isolation device or isolator 10 such as a hot-coupler, which serves to isolate between the primary and secondary sides of the transformer 3, to the pulse width modulator 5 as its pulse width control signal. Thus, the pulse width of a pulse developed at the output side of the pulse width modulator 5 is controlled, then the ON-time of the transistor 4 is controlled, and hence a DC voltage developed at the output side of the regulator 6 can be made constant.

In the above stable power supply circuit of a switching system, when heat is generated in the transformer 3 and the temperature of the transformer 3 becomes high to damage the transformer 3 itself and other circuit elements, the thermal fuse 2 is molten and then cut to protect the transformer 3.

This stable power supply circuit is of meritorious value, that the transformer 3 can be made small in size and hence the whole circuit becomes compact. The special thermal fuse 2 is large in size, which makes the whole circuit large, and the fuse 2 must be exchanged with a new one at every time when it is cut, with the result that the merit of the stable power supply circuit of switching system is reduced a great deal.

OBJECTS AND SUMMARY OF THE INVENTION

Accordingly, an object of the present invention is to provide a novel protective circuit for a switching regulator free from the defect inherent to the prior art.

Another object of the invention is to provide a protective circuit for a switching regulator in which temperature variation of a saturated magnetic flux density of the magnetic core of a transformer caused by temperature increase thereof is utilized effectively to protect the transformer.

A further object of the invention is to provide a protective circuit for a switching regulator in which current variation in the primary winding of transformer caused by variation of the saturated magnetic flux density of a magnetic core of the transformer is detected to protect the transformer and so on.

In accordance with an embodiment of the present invention, there is provided a protective circuit for a switching regulator which includes a DC voltage source having a pair of terminals, a transformer having primary, secondary windings and a magnetic core, a switching transistor having first, second and third elecrtrodes, a circuit for connecting the second and third electrodes of the switching transistor between the pair of terminals of the DC voltage source through the primary winding of the transformer, a DC output circuit connected across the secondary winding of the transformer to produce a DC signal in response to the ON/OFF operation of the switching transistor, a control circuit connected to the first electrode of the switching transistor so as to ON/OFF control the same in response to the DC signal of the DC output circuit, a detecting circuit for detecting an over-current flowing through the primary winding of the transformer and for producing a control signal in accordance with a change of the saturated magnetic flux density of the magnetic core of the transformer when the temperature thereof is increased until it reaches a predetermined value, and a protective circuit for stopping the ON/OFF operation of the switching transistor in response to the control signal from the detecting circuit.

The other objects, features and advantages of the present invention will become apparent from the following description taken in conjunction with the accompanying drawings through which the like reference numerals designate the same elements.

DESCRIPTION OF THE PREFERRED EMBODIMENTS

Figure 1:
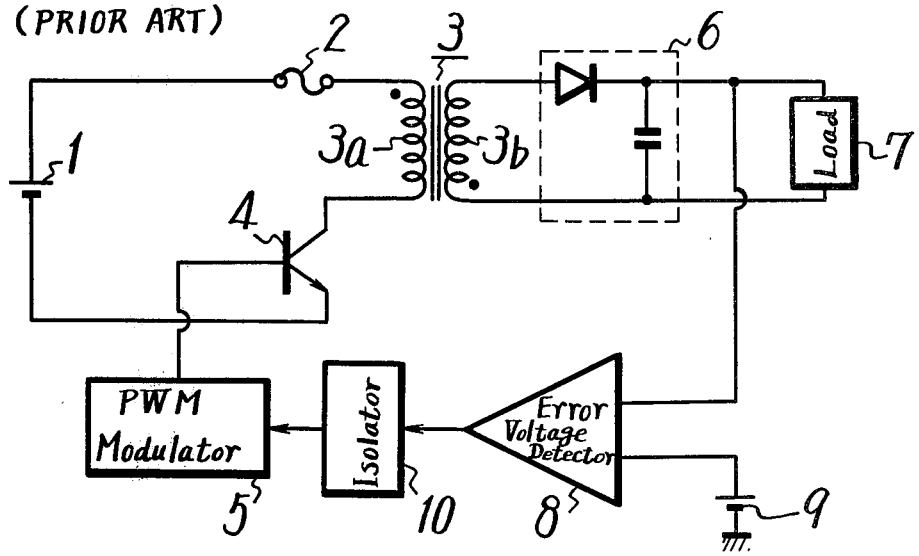
FIG. 1 is a circuit diagram showing a prior art protective circuit for a switching regulator.
Figure 2:
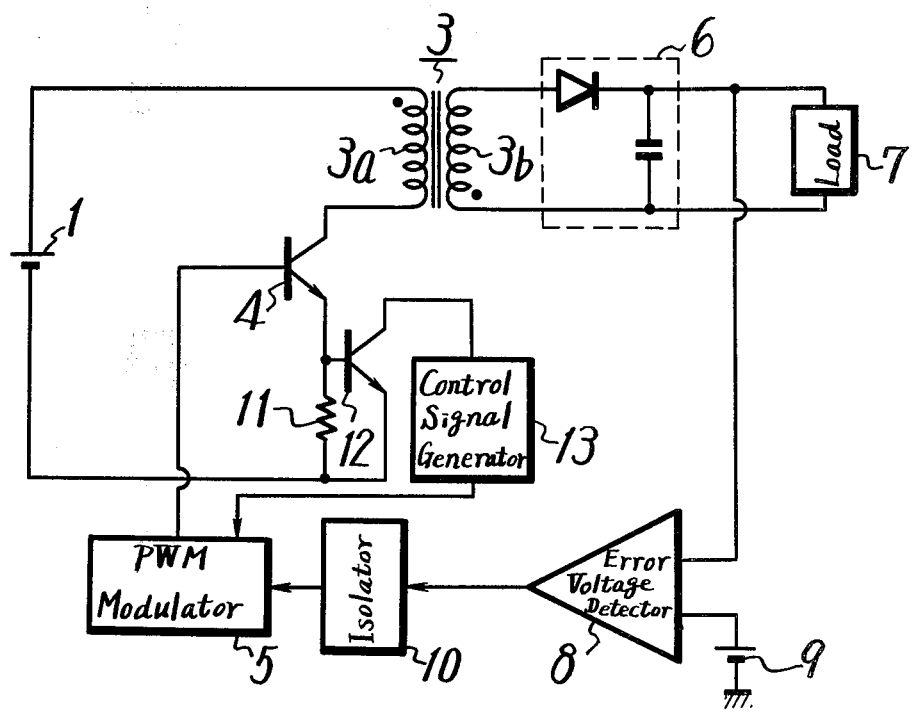
FIG. 2 is a circuit diagram showing an example of the protective circuit for a switching regulator according to the present invention.

Referring to FIG. 2, an example of the protective circuit for a switching regulator according to the present invention will be hereinafter described. In FIG. 2, reference numerals the same as those used in FIG. 1 represent that same element, respectively, and their detailed description will be omitted.

In the example of the invention shown in FIG. 2, the positive electrode of the battery 1 is connected through the primary winding 3a of the transformer 3 to the collector of an NPN-type transistor 4 which serves as the switching element which is connected at its emitter to the negative electrode of the battery 1 through a resistor 11 for detecting an over-current and also to the base of an NPN-type transistor 12 directly. The transistor 12 is connected at its emitter to the negative electrode of the battery 1 and at its collector to a control terminal of the pulse width modulator 5 through a control signal generator 13. Thus, when a current more than an over-current Ao set for the transistor 4 flows therethrough, the transistor 12 is made ON and hence the control signal generator 13 produces a control signal. The pulse width modulator 5 receives the control signal from the generator 13 and then stops to deliver the output therefrom and to make the transistor 4 OFF. Thus, the transistor 4 is protected.

Figure 3:
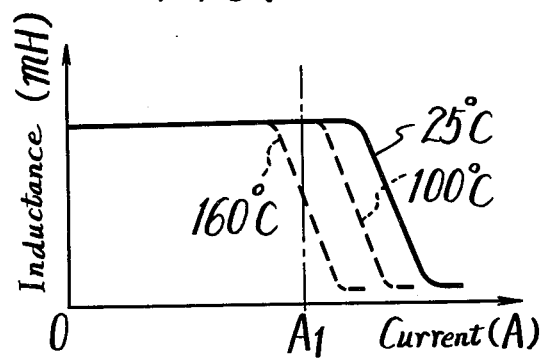
FIGS. 3 and 4A to 4C, inclusive, are graphs used for explaining the operation of the example of the invention shown in FIG. 2.

Further, in general, the saturated magnetic flux density of a ferrite core used in the transformer 3 becomes low as its temperature becomes high. For example, if the saturated magnetic flux density of the ferrite core is 5500 gauss at 25° C., it becomes 2500 gauss at 160° C. Accordingly, variation of the relation between the current flowing through the primary winding 3a of the transformer 3 and the inductance of the primary winding 3a in response to temperature increase is shown in the graph of FIG. 3. For example, it is assumed that under a stationary state or the temperature of the transformer 3 being 25° C. to 100° C., the current flowing through the primary winding 3a is taken as $A_1$. When the temperature of the transformer 3 increases to 160° C., the inductance of its primary winding 3a decreases suddenly, since the core of the transformer 3 is saturated.

With the above example of the present invention, the quality, shape and so on of the core and winding of the transformer 3 are so selected that the inductance of its primary winding 3a becomes as shown in the graph of FIG. 3 when the temperature of the core of the transformer 3 arrives at a predetermined temperature, for example 160° C. and the saturated magnetic flux density decreases. Further, the current $A_1$ flowing through the primary winding 3a under the stationary state is selected such that the inductance of the primary winding 3a becomes lower than a predetermined value when the temperature of the transformer 3 arrives at the predetermined temperature, for example, 160° C. Accordingly, the current flowing through the primary winding 3a of the transformer 3 becomes more than the current $A_o$, which will make ON the transistor 12 for detecting the over-current when the temperature of the transformer 3 increases. The other construction of the example of the invention shown in FIG. 2 is substantially the same as that of the prior art shown in FIG. 1.

Figure 4A:
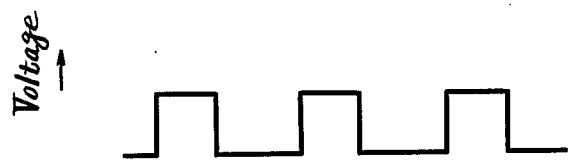
Figure 4B:
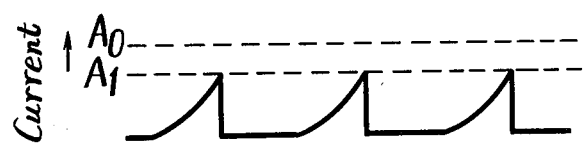

With the example of the invention shown in FIG. 2, when the temperature of the transformer 3 is lower than the predetermined temperature and the current flowing through the transistor 4 is lower than the over-current $A_o$ which is set as shown in FIG. 4B, the example of the invention operates similar to the prior art shown in FIG. 1, and hence, a DC voltage delivered to the output side of the regulator circuit 6 can be made constant. FIG. 4A shows an output signal from the pulse width modulator 5 which is applied to the base of the transistor 4.

Under the temperature of the transformer 3 being lower than the predetermined temperature, if the current flowing through the transistor 4 becomes more than the set over-current $A_o$ by some cause, the transistor 12 turns On. Thus, the control signal generator 13 generates the control signal which is applied to the pulse width modulator 5 to control the same. That is, the pulse width modulator 5 stops producing the output signal therefrom and hence the transistor 4 becomes OFF to be protected.

While, when the temperature of the transformer 3 exceeds the predetermined value such as 160° C., the inductance of the primary winding 3a of the transformer 3 becomes reduced. Therefore, the current flowing through the transistor 4 increases more than the set over-current $A_o$ and hence the transistor 12 turns On. As a result, the control signal generator 13 generates the control signal which is applied to the pulse width modulator 5 to stop the generation of the output signal thereof and hence the transistor 4 is made OFF to stop the supply of current to the primary winding 3a of the transformer 3. Thus, the transformer 3 is prevented from reaching a high temperature to protect itself and other elements from being damaged.

As set forth above, according to the present invention, the transformer 3 and other elements of the power supply circuit of the switching regulator system can be protected from being damaged by a temperature increase therein. Further, the over-current detecting circuits 11, 12 and 13 which are known per se, are used in the invention as they are, and there is of no need to use any additional elements, so that the circuit of the invention is simple in construction, made inexpensive and compact in size. As a result, the merit of the power supply circuit of the switching regulator system can be made sufficiently effective. Further, since in the invention the protective elements are not damaged upon protection, it is possible that the circuit self-returns.

Figure 5:
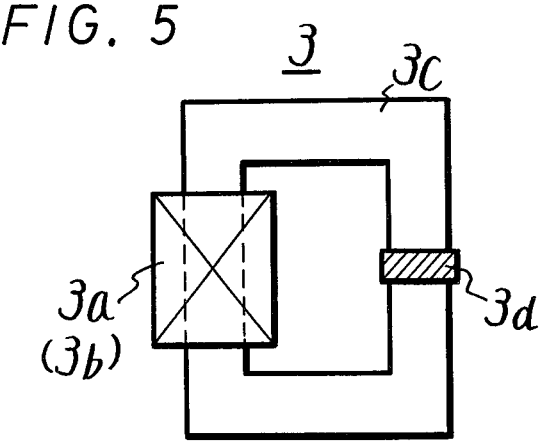
FIGS. 5, 7, 8, 9, 10 and 11 are, respectively, plan views showing transformers which can be used in the present invention.
Figure 6:
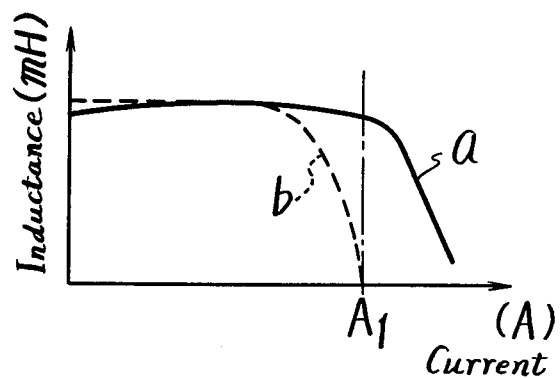
FIG. 6 is a graph showing the characteristics of the transformer shown in FIG. 5.
Figure 7:
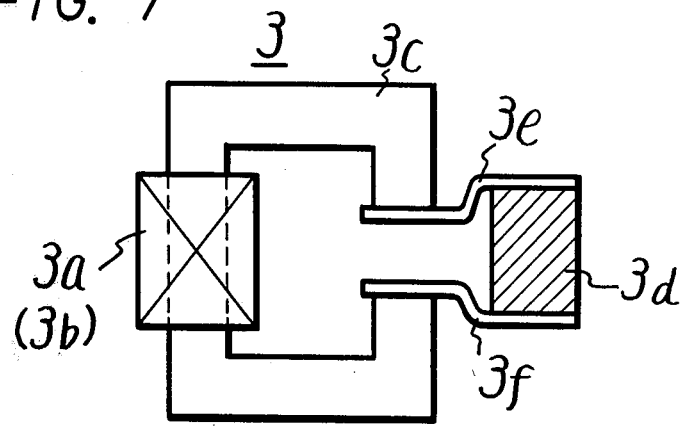

Transformers such as shown in FIGS. 5 and 7 can be used as the transformer 3 of this invention, which transformers 3 have poles to improve the magnetic utilization efficiency. The transformer 3 shown in FIG. 5 is provided with a magnet 3d interposed in a gap 3c of its core 3c. The primary winding 3a of the transformer 3 having the pole as shown in FIG. 5, shows the current-inductance characteristic represented by a curve a in FIG. 6. When the temperature of this transformer 3 becomes high and hence the temperature of the magnet 3d exceeds its Curie point, the magnetized area of the magnet 3d disappears and its shows no magnetism. At this time, the DC magnetic bias from the magnet 3d disappears in the transformer 3 and its current-inductance characteristics become the same as that of an ordinary transformer as represented by a dotted line curve b in FIG. 6. Therefore, when the transformer 3 shown in FIG. 5 is used, the Curie point of the magnet 3d is selected at a predetermined temperature and also the current flowing through the primary winding 3a of the transformer 3 under a stationary state is selected as a predetermined current $A_1$ as shown in FIG. 6. Thus, the transformer 3 shown in FIG. 5 affords the same effect as that of the foregoing example.

In general, since the Curie point of the magnet 3d is high in practice the magnet 3d is gripped between magnetic yokes 3e and 3f made of a magnetic material having a predetermined Curie point lower than that of the magnet 3d which yokes 3e and 3f are attached to the gap in the core 3c of the transformer 3. In this case, a temperature to be protected can be determined by the Curie point of the magnetic yokes 3e and 3f.

Another example of the protective circuit for a switching regulator according to the present invention will be described with reference to FIGS. 8 to 11 in which the reference numerals are the same as those used in FIGS. 1 and 2 to indicate the same elements and their detailed description will be omitted.

Figure 8:
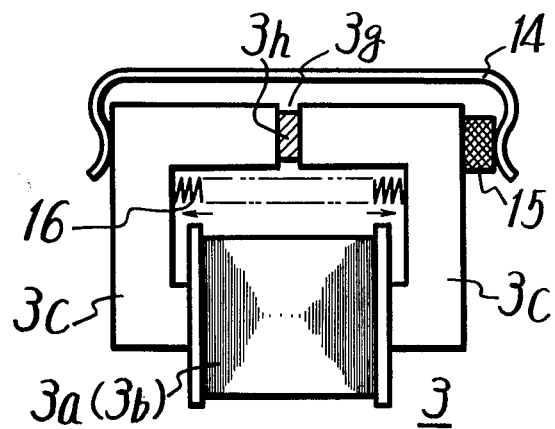

In the second example of the invention, such a transformer 3 shown in FIG. 8 is employed, in which its core is formed of two cores 3c, each being of a U-shape, and a gap 3g therebetween becomes substantially large as the temperature of the transformer 3 increases high abnormally. In the transformer 3 shown in FIG. 8, two cores 3c are gripped together by a member 14 made of metal, a spacer 15 made of a material such as nylon with a predetermined thickness which will be molten at a predetermined temperature, for example, 160° C. is inserted between one of the cores 3c and one end portion of the member 14, and a coiled spring is located between both the cores 3c to widen the gap 3g in which a spacer 3h is disposed. The primary winding 3a, and secondary winding 3b of the transformer 3 are wound on other end portions of the U-shaped cores 3c.

With the transformer 3 shown in FIG. 8, when its temperature increases and arrives at, for example 160° C., the spacer 15 is molten. Thus, due to the spring force of the spring 16, the gap 3g between the cores 3c is increased or widened and hence the inductance of the primary windin 3a decreases. That is, it is assumed in FIG. 8 that the length of the gap 3g is taken as $l_1$ when the spacer 15 is not molten; the length of the gap 3g is taken as $l_2$ when the spacer 15 is molten; no other gaps exist; the magnetic permeability of the cores 3d is taken as $\mu$; the length of the magnetic path is taken as l; the number of turns of the primary winding 3a is taken as N; and the cross-sectional area of the cores 3c is taken as S, respectively. When the spacer 15 is not molten, an inductance $L_1$ of the primary winding 3a is expressed as follows:

$$L_1 = N^2 \cdot S \cdot l^2 \frac{\mu \cdot \mu_0}{\mu_0 \cdot l + \mu \cdot l_1} \qquad (1)$$

while, when the spacer 15 is molten, the inductance $L_2$ of the primary winding 3a is expressed as follows:

$$L_2 = N^2 \cdot S \cdot l^2 \frac{\mu \cdot \mu_0}{\mu_0 \cdot l + \mu l_2} \qquad (2)$$

Since $l_1$ is smaller than $l_2$ ($l_1 < l_2$), $L_1$ is higher than $L_2$ ($L_1 < L_2$).

In this case, it is selected such that when the inductance of the primary winding 3a of the transformer 3 becomes $L_2$, the current flowing through the primary winding 3a exceeds the current $A_O$ which will make ON the transistor 12 for detecting over-current. The other circuit construction of the second example of the invention is formed substantially the same as that of the first example of the invention.

With the second example of the invention, when the current flowing through the transistor 4, under the temperature of the transformer 3 being lower than the predetermined temperature, is smaller than the over-current $A_O$ which is set as shown in FIG. 4B, the circuit of the example operates similar to the foregoing example to make the DC current obtained at the output terminal of the regulator 6 constant. While when the temperature of the transformer 3 is lower than the predetermined value but the current flowing through the transistor 4 exceeds the set over-current $A_O$ for some reason, the transistor 12 turns ON. Thus, the control signal generator 13 produces the control signal which is fed to the pulse width modulator 5, so that the latter stops to produce the output signal therefrom and hence the transistor 4 is made OFF to be protected.

Figure 4C:

When the temperature of the transformer 3 exceeds the predetermined temperature such as 160° C., its spacer 15 melts. As a result, the gap 3g is expanded by the spring force of the coiled spring 16 and the inductance of the primary winding 3a of the transformer 3 is reduced to $L_2$. Therefore, as shown in FIG. 4C, the current flowing through the transistor 4 exceeds the set over-current $A_O$ and hence the transistor 12 is made ON. Thus, the control signal generator 13 produces the control signal which is fed to the pulse width modulator 5 to stop the delivery of any output therefrom. As a result, the transistor 4 is made OFF, the current flowing through the primary winding 3a of the transformer 3 is cut to stop the temperature increase thereof, and hence the transformer 3 and other elements are protected from damages.

As set forth above, according to the above example of the present invention, the transformer 3 and other elements of the power supply circuit of the switching regulator system can be protected from being damaged by the temperature increase thereof. Further, the over-current detecting circuits 11, 12 and 13, which are used in the prior art, are used in the invention, as they are, and it is of no need to use any elements additionally, so that the circuit of this example becomes simple in construction, is made inexpensive and compact in size. As a result, the merit of the power supply circuit of the switching regulator system can be obtained sufficiently. Further, since in the invention the protective elements are not damaged upon protection, it is possible that the circuit self-returns.

Figure 9:
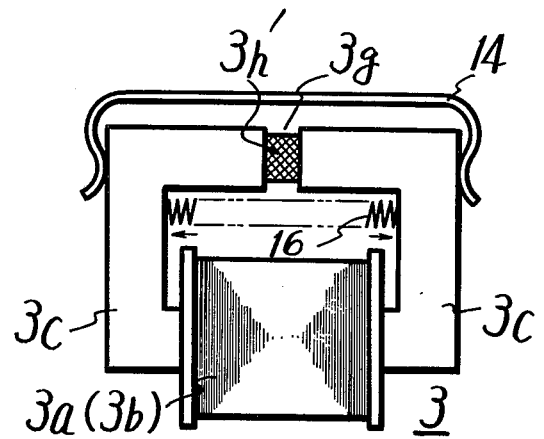
Figure 10:
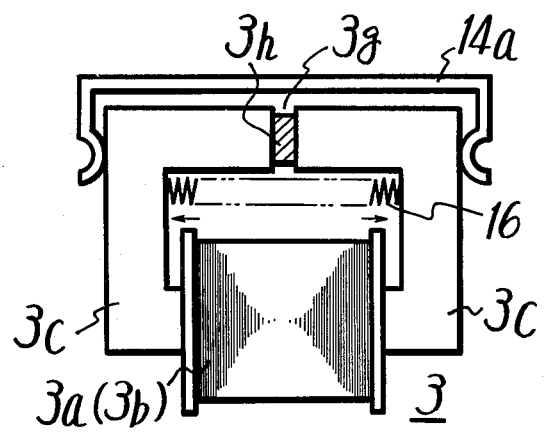
Figure 11:
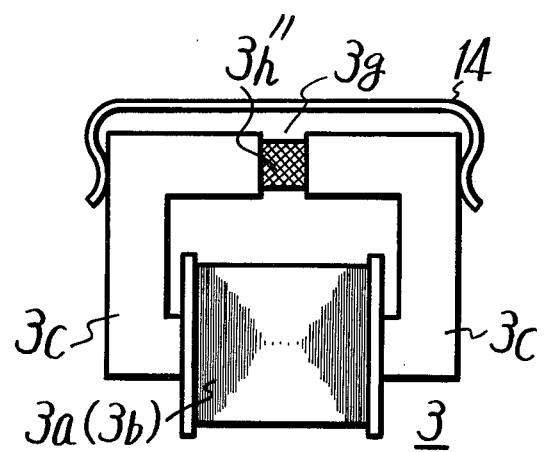

FIGS. 9, 10 and 11 show other examples of the transformer which can be used in the present invention, in which the parts corresponding to those of FIG. 8 are marked with the same reference numerals and their description will be omitted.

In the example of FIG. 9, a spacer 3h' located in the gap 3g is made of such a material as nylon which will be molten at the predetermined temperature and serves to be adhesive to one end of each of the cores 3c. Thus, when the spacer 3h' is molten, the member 14 is opened upwards by the spring force of the spring 16 to elongate the length of the gap 3g. It will be, therefore, easily understood that when the transformer 3 shown in FIG. 9 is used in place of that shown in FIG. 8, the same effect as that of the foregoing example is obtained.

FIG. 10 shows a further example of the transformer 3 usable in the invention in which a member 14a is made of such a material as nylon which will be molten at the predetermined temperature. Therefore, when the temperature of the transformer 3 arrives at the predetermined temperature such as 160° C., the member 14a is molten and the gap 3g is elongated by the spring force of the spring 16. Therefore, the same effect can be afforded when the transformer 3 shown in FIG. 10 is used in place of that shown in FIG. 8.

FIG. 11 shows a still further example of the transformer 3 usable in the invention. In this example, a spacer 3h'' charged in the gap 3g is made of a foam material which will produce foams therein at the predetermined temperature, for example, 160° C. to be swollen. Thus, when the temperature of the transformer 3 reaches the predetermined temperature such as 160° C., the spacer 3h'' charged in the gap 3g is formed to expand the gap 3g. In this example, therefore, no spring is used. It may be also possible that the same effect as those of the foregoing example can be obtained when the transformer shown in FIG. 11 is used in place of that shown in FIG. 8.

It will be apparent that many modifications and variations could be effected by one skilled in the art without departing from the spirit or scope of the novel concepts of the present invention, so that the spirit or scope of the invention should be determined by the appended claims only.

I claim as my invention:

1. A protective circuit for a switching regulator comprising:
   (a) a DC voltage source having a pair of terminals;
   (b) a transformer having primary, secondary windings and a magnetic core;
   (c) a switching transistor having first, second and third electrodes;
   (d) circuit means for connecting the second and third electrodes of said switching transistor between the pair of terminals of said DC voltage source through the primary winding of said transformer;
   (e) DC output means connected across the secondary winding of said transformer to produce a DC signal in response to the ON/OFF operation of said switching transistor;
   (f) control means connected to the first electrode of said switching transistor so as to ON/OFF control the same in response to the DC signal of said DC output means;
   (g) detecting means for detecting an overcurrent flowing through the primary winding of said transformer and for producing a control signal in accordance with a change of the saturated magnetic flux density of the magnetic core of said transformer when the temperature thereof is increased to a predetermined value; and
   (h) protective means for stopping the ON/OFF operation of said switching transistor in response to the control signal from said detecting means.

2. A protective circuit for a switching regulator according to claim 1, in which said first, second and third electrodes of said switching transistor are base, collector and emitter electrodes, respectively.

3. A protective circuit for a switching regulator according to claim 1, in which said detecting means comprises a current sensing resistor connected in series between the emitter of said switching transistor and one of the pair of terminals of said DC voltage source and a further switching transistor having base, emitter and collector, the base and emitter of which are connected across said current sensing resistor, and the collector of which produces said control signal.

4. A protective circuit for a switching regulator according to claim 3, in which said control means comprises an error voltage detector to detect DC voltage change of said DC output means and a pulse width modulator connected to said error voltage detector, the output of said modulator being supplied to the base of said switching transistor.

5. A protective circuit for a switching regulator according to claim 4, in which said error voltage detector and said modulator are isolated to each other by an isolator.

6. A protective circuit for a switching regulator according to claim 1, in which said magnetic core has a gap and a magnet is interposed therein.

7. A protective circuit for a switching regulator according to claim 6, in which said magnet is mounted by a pair of magnetic yokes which are mounted within said gap.

8. A protective circuit for a switching regulator according to claim 1, in which the magnetic core of said transformer has a gap and a thermal fusible spacer interposed therein, and in which a spring is attached to the magnetic core so as to widen said gap when said thermal fusible spacer is melted by temperature increase of said magnetic core thereby to reduce the inductance of said magnetic core.

9. A protective circuit for a switching regulator according to claim 1, in which said magnetic core has a gap and a thermal expansion material is interposed therein so as to widen said gap by temperature increase of said magnetic core, thereby to reduce the inductance of said magnetic core.

* * * * *